United States Patent
Pafumi et al.

(10) Patent No.: US 6,993,598 B2
(45) Date of Patent: Jan. 31, 2006

(54) METHOD AND APPARATUS FOR EFFICIENT SHARING OF DMA RESOURCE

(75) Inventors: James Anthony Pafumi, Leander, TX (US); Robert Paul Stelzer, Austin, TX (US); Wei Kuo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 10/682,410

(22) Filed: Oct. 9, 2003

(65) Prior Publication Data

US 2005/0080943 A1    Apr. 14, 2005

(51) Int. Cl.
*G06F 13/00* (2006.01)

(52) U.S. Cl. .......................................... 710/24; 710/308
(58) Field of Classification Search ............ 710/22–28, 710/53–35, 52–57, 308–312, 152–154, 111–113
See application file for complete search history.

(56) References Cited

U.S. PATENT DOCUMENTS

| | | | |
|---|---|---|---|
| 5,127,098 A | 6/1992 | Rosenthal et al. ............ 395/650 |
| 5,155,822 A | 10/1992 | Doyle et al. ................. 395/400 |
| 5,329,615 A | 7/1994 | Peaslee et al. ............... 395/162 |
| 5,448,702 A | 9/1995 | Garcia, Jr. et al. .......... 395/325 |
| 5,613,114 A | 3/1997 | Anderson et al. ........... 395/678 |
| 5,619,720 A * | 4/1997 | Garde et al. .................... 712/38 |
| 5,644,784 A | 7/1997 | Peek ............................ 395/844 |
| 5,761,532 A | 6/1998 | Yarch et al. ................. 395/842 |
| 5,781,799 A * | 7/1998 | Leger et al. ................... 710/22 |
| 5,828,903 A * | 10/1998 | Sethuram et al. ............. 710/53 |
| 5,850,570 A * | 12/1998 | Shoji ............................ 710/24 |
| 5,894,586 A | 4/1999 | Marks et al. ................. 395/848 |
| 5,933,654 A * | 8/1999 | Galdun et al. ................. 710/23 |
| 6,075,938 A | 6/2000 | Bugnion et al. ........ 395/500.48 |
| 6,092,127 A * | 7/2000 | Tausheck ....................... 710/56 |
| 6,128,669 A | 10/2000 | Moriarty et al. ................ 710/1 |
| 6,169,745 B1 | 1/2001 | Liu et al. ..................... 370/463 |
| 6,199,121 B1 | 3/2001 | Olson et al. .................. 710/24 |
| 6,199,124 B1 | 3/2001 | Ramakrishnan et al. ...... 710/40 |
| 6,324,598 B1 * | 11/2001 | Olson et al. .................. 710/24 |
| 6,324,599 B1 * | 11/2001 | Zhou et al. ................... 710/26 |
| 6,336,150 B1 * | 1/2002 | Ellis et al. ..................... 710/5 |
| 6,425,054 B1 | 7/2002 | Nguyen ...................... 711/117 |

(Continued)

FOREIGN PATENT DOCUMENTS

WO    WO 00/67131    11/2000

(Continued)

OTHER PUBLICATIONS

IBM Technical Disclosure Bulletin, "Table-Driven Hardware Controller", Aug. 1987, pp. 1013-1018.

*Primary Examiner*—Christopher B. Shin
(74) *Attorney, Agent, or Firm*—Duke W. Yee; Marilyn Smith Dawkins

(57) ABSTRACT

A method, apparatus, and computer instructions for managing direct memory access transfers. Monitoring is performed for an event to pass ownership of a direct memory access resource to a new thread. A buffer of the new thread is added by an operating system component to the end of a direct memory access chain of requests from the current thread. The addition of this buffer to the end of a direct memory access chain provides an anchor point for the new thread to add additional requests for the direct memory access resource.

18 Claims, 4 Drawing Sheets

U.S. PATENT DOCUMENTS

| | | | |
|---|---|---|---|
| 6,519,265 B1 | 2/2003 | Liu et al. | 370/463 |
| 6,647,456 B1 | 11/2003 | Van Dyke et al. | 711/105 |
| 6,667,988 B1 | 12/2003 | Liu et al. | 370/463 |
| 6,718,405 B2 * | 4/2004 | Rogers | 710/22 |
| 2002/0016873 A1 | 2/2002 | Gray et al. | 710/28 |
| 2002/0019843 A1 | 2/2002 | Killian et al. | 709/102 |
| 2004/0267982 A1 * | 12/2004 | Jackson et al. | 710/52 |
| 2005/0033874 A1 * | 2/2005 | Futral et al. | 710/22 |

FOREIGN PATENT DOCUMENTS

| | | |
|---|---|---|
| WO | WO 03/001648 | 2/2003 |

* cited by examiner

METHOD AND APPARATUS FOR EFFICIENT SHARING OF DMA RESOURCE

BACKGROUND OF THE INVENTION

1. Technical Field

The present invention relates generally to an improved data processing system and in particular, to a method and apparatus for managing data transfers. Still more particularly, the present invention relates to a method, apparatus, and computer instructions for sharing DMA resources.

2. Description of Related Art

In data processing systems, data is transferred within a data processing system using different mechanisms. One mechanism is direct memory access (DMA), which allows for data transfers from memory to memory without using or involving a central processing unit (CPU). For example, with DMA, data may be transferred from a random access memory (RAM) to a DMA resource, such as a hard disk drive, without requiring intervention from the CPU. DMA transfers also are used in sending data to other DMA resources, such as a graphics adapter or Ethernet adapter. In these examples, a DMA resource is any logic or circuitry that is able to initiate and master memory read/write cycles on a bus. This resource may be located on the motherboard of the computer or on some other pluggable card, such as a graphics adapter or a disk drive adapter.

Multiple user level threads often desire to use a DMA resource. In the graphics environment, the typical method for sharing a DMA resource is to assign the resource to some central facility, such as a graphics device driver running within the operating system kernel. User level threads, such as graphics threads, wishing to use the DMA resource send or place requests in a queue for the central facility in the kernel of the operating system. This central facility dequeues a request and presents the request to the DMA resource whenever the resource becomes idle.

This presently available mechanism is inefficient. For example, the DMA resource is idle while the central facility dequeues or obtains requests from the queue for processing. The user level thread has to make an operating system call. This operating system call is also referred to as a service call (SVC).

Therefore, it would be advantageous to have an improved method, apparatus, and computer instructions for sharing DMA resources.

SUMMARY OF THE INVENTION

The present invention provides a method, apparatus, and computer instructions for managing direct memory access transfers. Monitoring is performed for an event to pass ownership of a direct memory access resource to a new thread. A buffer of the new thread is added by an operating system component to the end of a direct memory access chain of requests from the current thread. The addition of this buffer to the end of a direct memory access chain provides an anchor point for the new thread to add additional requests for the direct memory access resource.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
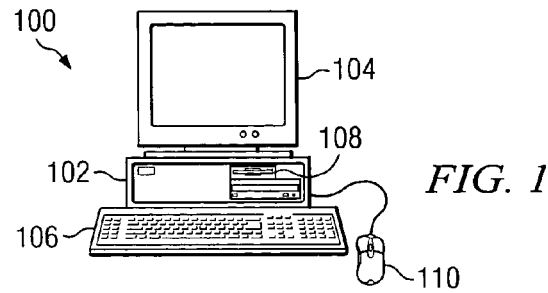
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
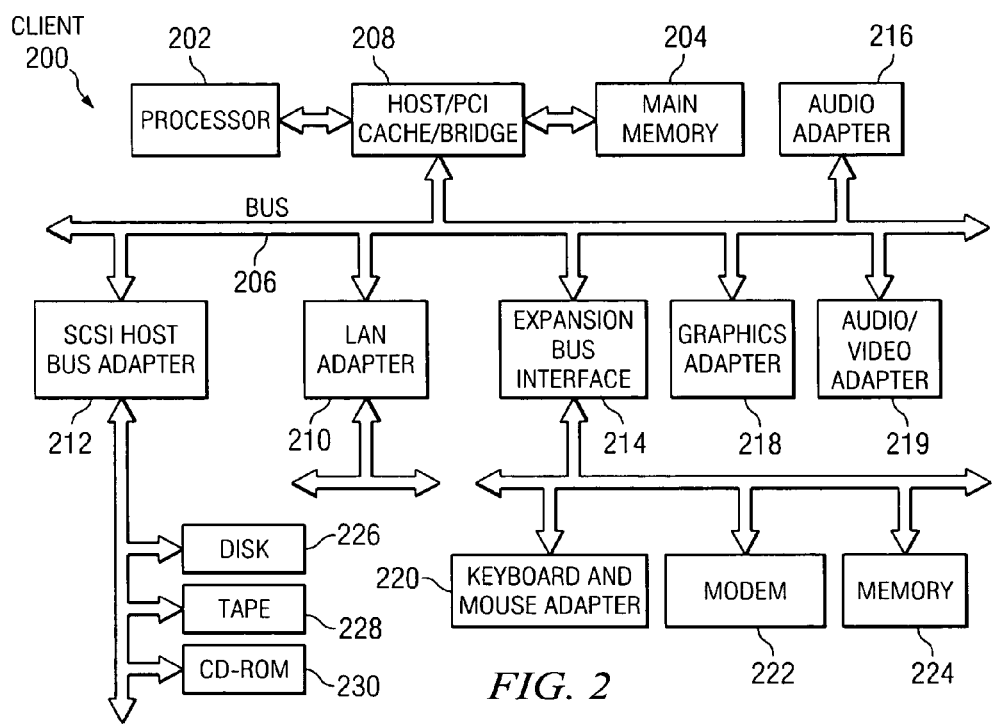
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The present invention provides a method, apparatus, and computer instructions for sharing DMA resources. The mechanism of the present invention allows user level threads to directly enqueue or place requests to transfer data on a queue for the DMA resource. Additionally, in the illustrative examples, a central facility in the operating system manages the amount of time during which a particular thread may use the DMA resource. Further, addressability of the queue is provided to a new thread when DMA ownership transfer occurs by using a zero length DMA request in these examples. In this manner, the mechanism of the present invention provides a seamless approach for sharing a DMA resource between different requesters, such as user level threads for applications. This mechanism provides for sharing of the resource without inefficiencies interjected by the use of service calls for each request or through idle cycles in DMA transfers that occur when each data transfer is handled through a request to a control facility in an operating system.

Figure 3:
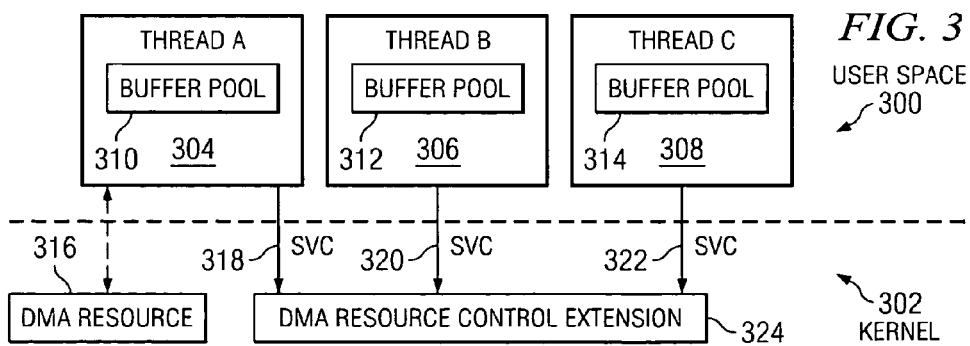
FIG. 3 is a diagram illustrating components used in DMA resource sharing in accordance with a preferred embodiment of the present invention.

With reference now to FIG. 3, a diagram illustrating components used in DMA resource sharing is depicted in accordance with a preferred embodiment of the present invention. As illustrated, user space 300 and kernel 302 are present in which user space 300 includes thread A 304, thread B 306, and thread C 308.

As shown, each of these threads contains a buffer pool, in which the buffer pool is only known by and accessible to the thread owning the pool and operating system kernel 302. Buffer pool 310 is owned by thread A 304; buffer pool 312 is owned by thread B 306; and buffer pool 314 is owned by thread C 308. All of these threads desire to access DMA resource 316 in this illustrative example. Each of these threads initially makes a service call, SVC 318, SVC 320, and SVC 322, to DMA resource control extension 324 within kernel 302. These calls are to request DMA service and to map the pool buffers for DMA data transfers. In these examples, mapping refers to the operation or operations required such that the buffer's virtual memory may be accessed by DMA resource 316. Such mapping is typically provided by most modern operating systems.

In this example, thread A 304 is initially given access to DMA resource 316. The other threads, thread B 306 and thread C 308, are placed into a sleep mode until they are provided with access or ownership of DMA resource 316. When some criteria or event, such as some selected amount of time has elapsed, DMA resource control extension 324 removes access to or ownership of DMA resource 316 from thread A 304 and provides the next thread, thread B 306, access or ownership to DMA resource 316. Later, thread C 308 is provided with access to DMA resource 316 when DMA resource control extension 324 decides that it is time to change ownership of DMA resource 316. Maximum bus transfer rates are approached by tuning the time slice appropriately for the threads in these examples.

In these examples, access to DMA resource 316 is defined within the facilities provided by the operating system in kernel 302. The facility may, for example, take the form of a spin lock or a granting and revoking of addressability to DMA resource 316. In the later case, DMA resource control extension 324 provides a handler that places the threads in a sleep mode until the thread is to obtain ownership or access to DMA resource 316. When a thread has access to DMA resource 316, DMA transfers using this resource can be made without sending additional requests to DMA resource control extension 324 in these illustrative examples. In this manner, inefficiencies currently present with having to send a request for each DMA transfer directly to a central facility, such as DMA resource control extension 324, are avoided.

In these examples, DMA resource 316 includes an ability to process a list or chain of requests. In other words, DMA resource 316 may handle multiple requests that are chained or placed in a list such that DMA resource 316 may process each of these requests without intervention from DMA resource control extension 324. The chain or list of requests may be implemented through various control structures. In the illustrative examples, the control structure may contain items, such as a transfer length, transfer direction, location of data, and location of next control structure.

The request chain also may be constructed using a traditional scatter/gather table. Some applications may need to read or write data to multiple buffers, which are separated in a memory. Although this reading or writing may be performed with multiple calls, it is typically insufficient with the overhead associated with each kernel call. As a result, many platforms provide high-speed primitives to perform scatter/gather operations in a single kernel cell. When a read function occurs, data is read from files and scattered into buffers in a vector. As each buffer is filled, the data is then sent to the next buffer. With a write function, data is gathered from the buffers described in the vector and written into the files. As each buffer is written, the process moves on to the next buffer for writing. In this manner, an efficient reading and writing of buffers is performed.

As previously stated, DMA resource control extension 324 grants ownership for DMA resource 316 to a single thread for some period of time. After the period of time expires, DMA resource control extension 324 revokes the ownership from that thread and grants ownership to a new thread. Normally, the new thread that receives ownership of DMA resource 316 would be unable to access the DMA request chain built by the previous owner of DMA resource 316 because the associated memory does not reside within the address space of the new thread. However, a mechanism of the present invention includes an additional feature that provides the new owner of the DMA resource with access to the DMA request chain. After granting ownership of the DMA resource to a different thread, DMA resource control extension 324 generates a zero transfer length DMA request using the memory from the buffer pool of the new owner and connects this request to the end of the DMA request chain. The request chain is now accessible by the new owner so that this owner may immediately start adding requests to the DMA request chain when it resumes execution. In this manner, the mechanism of the present invention provides a seamless approach to sharing a DMA resource without the inefficiencies injected by requiring a service call for each DMA transfer request or injected by waiting for the DMA resource to go idle before switching ownership.

Figure 4:
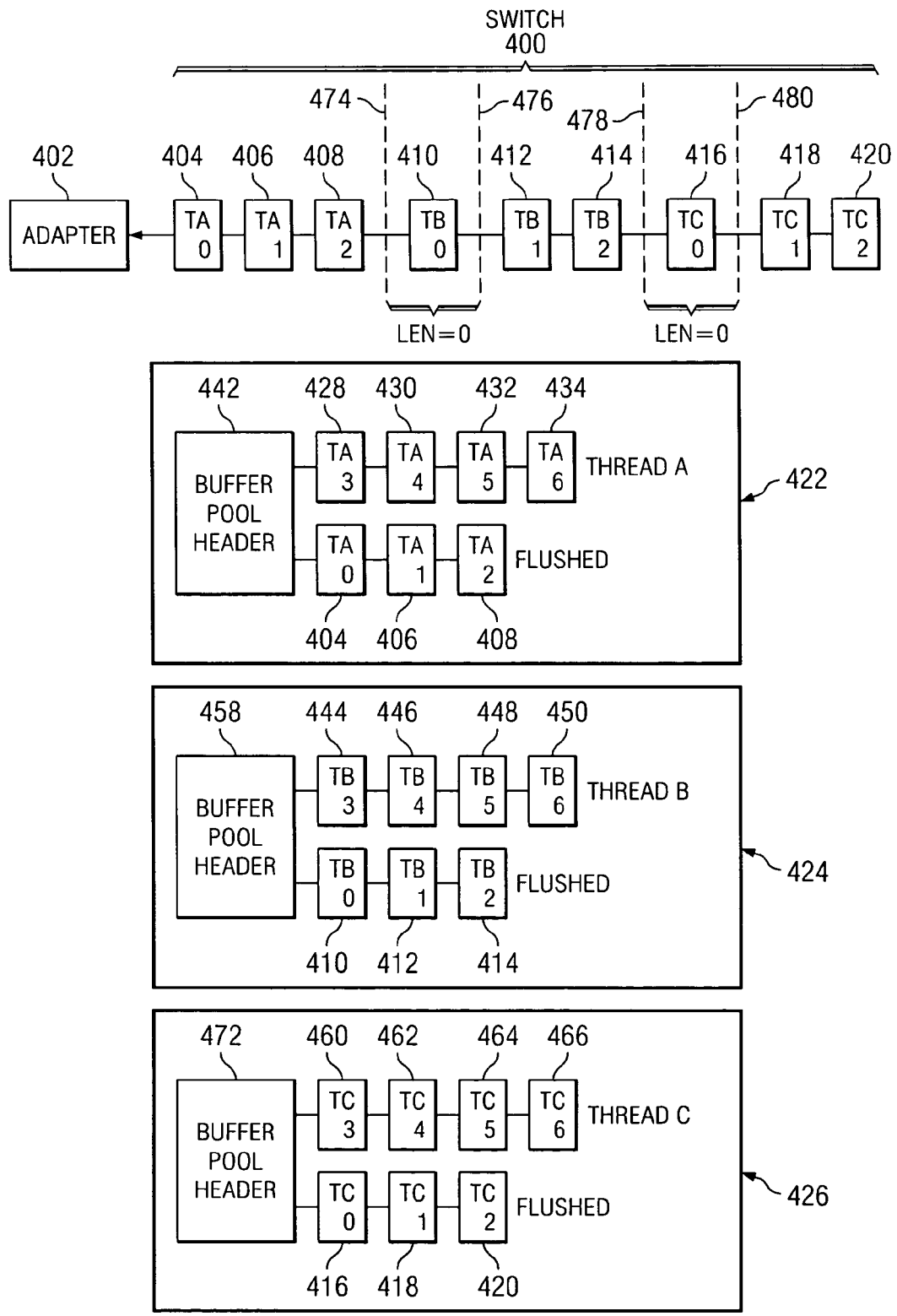
FIG. 4 is a diagram illustrating a chain of DMA requests in accordance with a preferred embodiment of the present invention.

Turning now to FIG. 4, a diagram illustrating a chain of DMA requests is depicted in accordance with a preferred embodiment of the present invention. In this example, request chain 400 is handled by DMA resource 402, which is a graphics adapter in these examples.

Request chain 400 includes buffers 404, 406, 408, 410, 412, 414, 416, 418, and 420 in these examples. Buffers 404, 406, and 408 originate from buffer pool 422, which corresponds to buffer pool 310 for thread A 304 in FIG. 3. Buffers 410, 412, and 414 originate from buffer pool 424. This buffer pool corresponds to buffer pool 312 for thread B 306 in FIG. 3. Buffers 416, 418, and 420 are from buffer pool 426, which corresponds to buffer pool 314 for thread C 308 in FIG. 3.

In these examples, each buffer pool has a buffer pool header, which contains implementation of dependent information concerning the buffer pool, as well as the anchor points for two separate buffer lists. One list contains those buffers, which have been flushed or enqueued to the DMA resources for processing, and the other list contains those buffers, which are not currently being used. These lists are used by the thread to track buffer utilization and are not used by the DMA resource. When a new request is desired, first the thread recovers any buffers that have already been processed moving them from the flush list to the available list. Then, the thread selects the first buffer from the available list, fills this first buffer with data as required, appends the buffer to the chain of DMA requests for the DMA resource, and moves the buffer from the available list to the flushed list.

The depiction for buffer pool 422 shows such a pool header 442 and two buffer lists. The "Flushed" list contains buffers 404, 406, and 408 in the order in which they were enqueued to adapter 402. Buffers 428, 430, 432, and 434 form the list of available buffers, which may be used for future DMA requests.

Buffer pool 424 consists of available buffers 444, 446, 448, and 450 that may be sent to DMA resource 316 for transfer in these examples. Additionally, flushed buffers 410, 412, and 414 are present in buffer pool 424. These buffers are ones that have been appended to request chain 400. All of these buffers are identified through buffer pool header 458. In buffer pool 426, available buffers 460, 462, 464, and 466 are present. Also, flushed buffers 416, 418, and 420 are present in buffer pool 426. All of these buffers are provided with anchor points in buffer pool header 472.

In these examples, thread A 304 in FIG. 3 is initially given access to DMA resource 402 by the DMA resource control extension. Thread A then enqueues requests to adapter 402 forming request chain 400.

Later, when a switch occurs as indicated by lines 474 and 476, the DMA resource control extension revokes ownership of the DMA resource to the first thread and grants it to the second thread. In this example, thread B 306 is the thread granted access to the DMA resource. The DMA resource control extension then takes a buffer from the new thread's buffer pool, such as buffer 410 in buffer pool 424, and adds that buffer to DMA chain 400. The buffer is added with a zero length setting so that the buffer is ignored by DMA resource 402. At this time, thread B is able to add additional buffers, buffers 412 and 414 to DMA chain 400.

A second switch in these examples is illustrated by lines 478 and 480. At this point, a third thread, thread C, has been granted access to DMA resource 402. This thread is provided with an anchor point to add additional requests to DMA chain 400 through the DMA resource control extension adding buffer 416 to DMA chain 400. This buffer also has a length of zero causing DMA resource 402 to ignore this request. Without buffers 410 and 416 being added by the DMA resource control extension, the different threads would be unable to add requests to DMA chain 400 because access to the buffer at the end of the chain would be unavailable.

Figure 5:
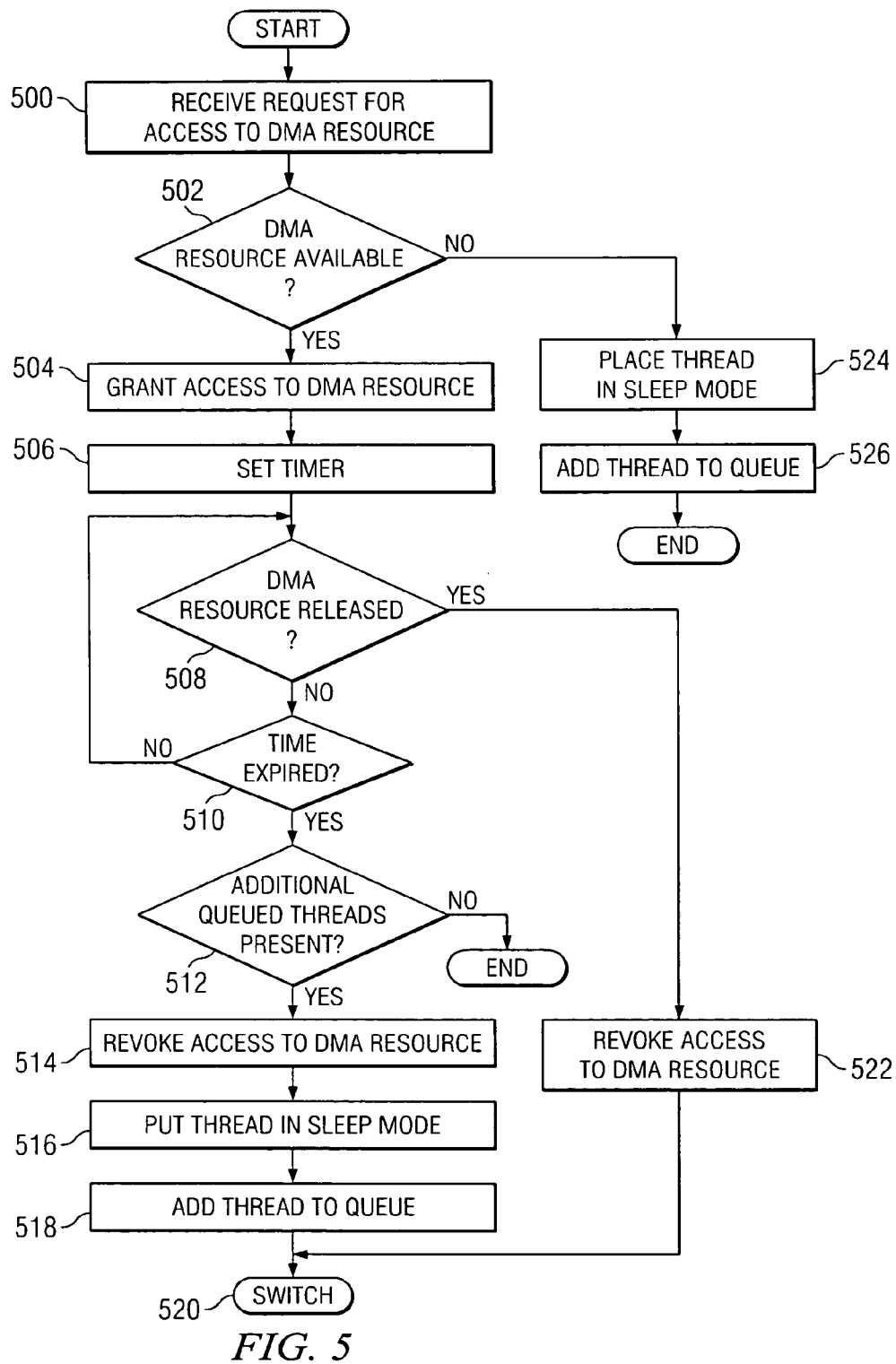
FIG. 5 is a flowchart of a process for placing threads on a queue in accordance with a preferred embodiment of the present invention.

Turning now to FIG. 5, a flowchart of a process for placing threads on a queue is depicted in accordance with a preferred embodiment of the present invention. The process illustrated in FIG. 5 may be implemented in a operating system component, such as DMA resource control extension 324 in FIG. 3.

The process begins by receiving a request for access to a DMA resource (step 500). A determination is made as to whether the DMA resource is available (step 502). If the DMA resource is available, access is granted to the DMA resource (step 504). Thereafter, a timer is set (step 506). A determination is made as to whether the thread has released the DMA resource (step 508). If the thread has not released the DMA resource, a determination is made as to whether the time for the timer has expired (step 510). If the timer has not expired, the process returns to step 508. If the timer has expired, a determination is made as to whether additional queued threads are present (step 512). If additional threads are not present then the process terminates. Otherwise, the current thread's access to the DMA resource is revoked (step 514), the current thread is place in sleep mode (step 516), the current thread is added to the queue (step 518), and a switch occurs as described in FIG. 6 (step 520).

Figure 6:
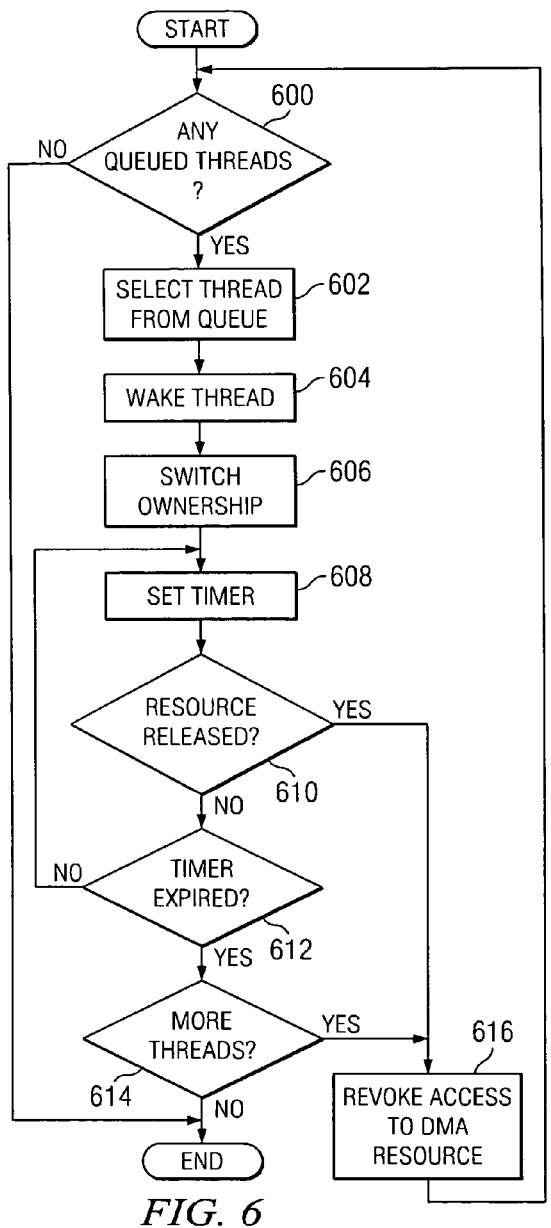
FIG. 6 is a flowchart of a process for switching resource ownership between different threads in accordance with a preferred embodiment of the present invention.

With reference back to step 508, if the DMA resource has been released by the thread, access to the DMA resource is revoked (step 522) and a switch occurs as described in the process in FIG. 6 (step 520).

With reference again to step 502, if the DMA resource is unavailable, this thread is placed in a sleep mode (step 524), and the thread is added to a queue (step 526). When an event, such as the expiration of a timer occurs for a time slice, the next thread in the queue may be selected and granted access to the DMA resource.

Turning now to FIG. 6, a flowchart of a process for switching between different threads is depicted in accordance with a preferred embodiment of the present invention. The process illustrated in FIG. 6 may be implemented in a kernel component, such as DMA resource control extension 324 in these examples.

The process begins by determining whether queued threads are present (step 600). This step is used to determine whether any threads are waiting for service. If queued threads are present, a new thread is selected from the queue (step 602). The thread selected is woken (step 604). Thereafter, the ownership of the DMA resource is switched to that thread (step 606). The change of ownership includes in these illustrative examples having the DMA resource control extension adding a buffer to the end of the chain. This buffer is selected from a buffer pool owned by the thread being granted ownership of the DMA resource. In this manner, the thread may now add additional requests to the DMA chain directly without needing aid from the kernel. Next, a timer is set (step 608).

A determination is made as to whether the resource has been released by the thread (step 610). If the resource has not been released, a determination is made as to whether the timer has expired (step 612). If the timer has not expired, the process returns to step 608. Otherwise, a determination is made as to whether additional threads are present (step 614). If additional threads are present, access to the DMA resource is revoked (step 616). In these examples, the timer corresponds to a time slice and is used to change ownership of the DMA resource for different time slices. Thereafter, the process returns (step 600) to determine whether a thread is present in the queue.

With reference again to step 614, if additional threads are not present, the access to the DMA resource is not revoked to allow the current thread to continue to access the DMA resource. With reference again to step 600, if queued threads are absent, the process terminates.

Figure 7:
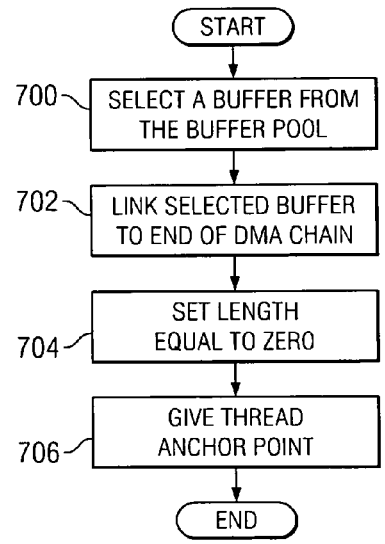
FIG. 7 is a flowchart of a process for providing an anchor point to a thread in accordance with a preferred embodiment of the present invention.

With reference now to FIG. 7, a flowchart of a process for providing an anchor point to a thread is depicted in accordance with a preferred embodiment of the present invention. The process illustrated in FIG. 7 may be implemented in a component, such as DMA resource control extension 324 in FIG. 3.

The process begins by selecting a buffer from a buffer pool (step 700). Thereafter, the selected buffer is linked to the end of the DMA chain (step 702). The length of the buffer is set equal to zero (step 704). This length is set equal to zero to cause the DMA resource to ignore the buffer. The anchor point is then given to the thread (step 706) with the process terminating thereafter. In this manner, this thread is now able to add additional requests to the DMA chain.

Figure 8:
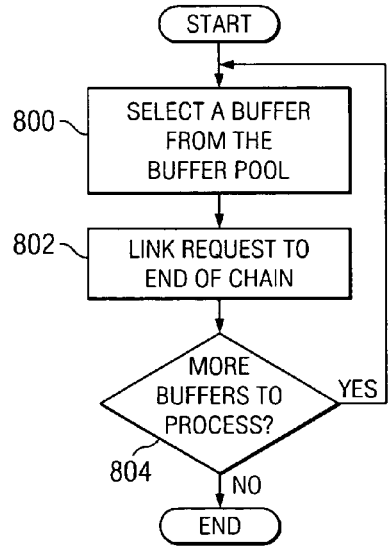
FIG. 8 is a flowchart of a process illustrating a thread adding buffers to a request chain in accordance with a preferred embodiment of the present invention.

With reference to FIG. 8, a flowchart of a process illustrating a thread adding buffers to a request chain is depicted in accordance with a preferred embodiment of the present invention. The process illustrated in FIG. 8 may be implemented in a thread, such as thread A 304 in FIG. 3.

The process begins by selecting a buffer from the buffer pool (step 800). Next, this selected buffer is linked to the end of the request chain (step 802). A determination is then made to whether additional buffers are present for processing (step 804). If additional buffers are present, the process returns to (step 800). Otherwise, the process terminates.

Thus, the present invention provides an improved method, apparatus, and computer instructions for efficiently sharing DMA resources. The mechanism of the present invention provides this ability in the illustrative examples by allowing user level threads to directly add or queue requests to the DMA resource. A central facility in the kernel manages time slices during which a thread may use the DMA resource. Further, the addressability of the DMA chain in DMA ownership transfers occurs through the central facility adding a buffer to the end of the chain from the buffer pool of the new thread that is to have ownership of the DMA resource. As a result, the sharing of the DMA resource occurs without having to have the threads send service calls to the kernel each time a request for data to be transferred is to be made.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing direct memory access transfers, the method comprising:
    monitoring for an event to pass a new thread ownership to a direct memory access resource; and
    responsive to detecting the event, adding a buffer of the new thread to an end of a direct memory access chain of requests for the current thread to generate a direct memory access request, wherein adding the buffer to the end of a direct memory access chain provides an anchor point for the new thread to add additional requests for the direct memory access resource.

2. The method of claim 1, wherein the direct memory access request is a zero transfer length direct memory access request.

3. The method of claim 1, wherein the monitoring step and the adding step are performed by an operating system.

4. The method of claim 3, wherein the buffer is in a memory location for the new thread.

5. The method of claim 1, wherein the event is a selected period of time.

6. The method of claim 1, wherein the direct memory access resource is at least one of a graphics adapter, a communications adapter, and a hard disk drive.

7. The method of claim 1, wherein the new thread is in a sleep mode and further comprising:
    waking the new thread from the sleep mode to pass ownership of the direct memory access resource to the new thread.

8. A direct memory access control system comprising:
    a direct memory access engine, wherein the direct memory access engine processes a chain of requests and accepts requests from user level threads; and
    a direct memory access control component, wherein the direct memory access control component grants access to the direct memory access engine a single thread at a time, detects an event to transfer access to the direct memory access engine from a first thread to a second thread, links a selected buffer from a buffer pool of the second thread to a last buffer in the chain of requests in response to detecting the event, wherein the buffer provides the second thread access to the direct memory access engine.

9. The method of claim 8, wherein the selected buffer has a length set equal to zero causing the direct memory access engine to ignore the buffer and wherein the selected buffer provides an addressable anchor point for the second thread to chain requests for the second thread.

10. A data processing system for managing direct memory access transfers, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to monitor for an event to pass a new thread ownership to a direct memory access resource; and add a buffer of the new thread to an end of a direct memory access chain of requests for the current thread to generate a direct memory access request in which adding the buffer to the end of a direct memory access chain provides an anchor point for the new thread to add additional requests for the direct memory access resource in response to detecting the event.

11. A data processing system for managing direct memory access transfers, the data processing system comprising:
    monitoring means for monitoring for an event to pass a new thread ownership to a direct memory access resource; and
    adding means, responsive to detecting the event, for adding a buffer of the new thread to an end of a direct memory access chain of requests for the current thread to generate a direct memory access request, wherein adding the buffer to the end of a direct memory access chain provides an anchor point for the new thread to add additional requests for the direct memory access resource.

12. The data processing system of claim 11, wherein the direct memory access request is a zero transfer length direct memory access request.

13. The data processing system of claim 11, wherein the monitoring means and the adding means are performed by an operating system.

14. The data processing system of claim 13, wherein the buffer is in a memory location for the new thread.

15. The data processing system of claim 11, wherein the event is a selected period of time.

16. The data processing system of claim 11, wherein the direct memory access resource is at least one of a graphics adapter, a communications adapter, and a hard disk drive.

17. The data processing system of claim 11, wherein the new thread is in a sleep mode and further comprising:
    waking means for waking the new thread from the sleep mode to pass ownership of the direct memory access resource to the new thread.

18. A computer program product in a computer readable medium for managing direct memory access transfers, the computer program product comprising:
    first instructions for monitoring for an event to pass a new thread ownership to a direct memory access resource; and
    second instructions, responsive to detecting the event, for adding a buffer of the new thread to an end of a direct memory access chain of requests for the current thread to generate a direct memory access request, wherein adding the buffer to the end of a direct memory access chain provides an anchor point for the new thread to add additional requests for the direct memory access resource.

\* \* \* \* \*